Feb. 26, 1963  D. F. THOMAS ETAL  3,079,605
CENTRIFUGAL PUMP WITH DOUBLE MECHANICAL SEAL
Filed May 14, 1959  2 Sheets-Sheet 1

INVENTOR;
DAVID F. THOMAS.
RICHARD C. EWING

BY Robert M. Dunning

ATTORNEY

Feb. 26, 1963   D. F. THOMAS ETAL   3,079,605
CENTRIFUGAL PUMP WITH DOUBLE MECHANICAL SEAL
Filed May 14, 1959  2 Sheets-Sheet 2

INVENTOR;
DAVID F. THOMAS.
RICHARD C. EWING

BY *[signature]*

ATTORNEY

United States Patent Office 3,079,605
Patented Feb. 26, 1963

3,079,605
CENTRIFUGAL PUMP WITH DOUBLE
MECHANICAL SEAL
David F. Thomas and Richard C. Ewing, St. Paul, Minn., assignors to Waterous Company, St. Paul, Minn., a corporation of Minnesota
Filed May 14, 1959, Ser. No. 813,125
4 Claims. (Cl. 277—27)

This invention relates to an improvement in centrifugal pump with double mechanical seal and deals particularly with a vehicle mounted pump useful in pumping liquid fuels and the like.

Various types of pumps have been produced for pumping liquid such as liquid fuel and the like from a tank which may be supported on the vehicle to a point of delivery. The pumps of this type are often driven from the power take off the vehicle transmission. One of the difficulties experienced with pumps of this type lies in the fact that the seals encircling the impeller shaft and interposed between this impeller shaft and the pump housing are occasionally injured in the event the pump runs dry. For example, if the fuel in the supply tank should become depleted or should the operator fail to open any valves in the supply line which permit the fuel to flow into the pump, the operation of the pump may cause undue wear upon the seals and necessitate a costly repair job. It is an object of the present invention to eliminate this difficulty.

A feature of the present invention resides in the provision of a centrifugal pump of the type described including a pair of mechanical sealing elements which are held from rotation and which seal against a sealing ring mounted on, and rotatable with, the impeller shaft. These mechanical seals and intermediate sealing ring are mounted in a generally cylindrical sleeve or hub encircling the impeller shaft. An oil reservoir is provided in the pump housing intermediate the ends of this sleeve or hub so that the ends of the mechanical seals which bear against the sealing ring may be constantly lubricated. The outer end of one of the mechanical seals is normally subjected to fluid pressure which is usually intermediate the suction pressure and the discharge pressure of the centrifugal pump. The outer end of the other mechanical seal is subjected to atmospheric pressure. The arrangement is such that in the event the pump runs dry, the pressure of the mechanical seals against the sealing ring is relieved to some extent, thus preventing undue wear upon the seal and preventing injury thereto.

A further feature of the present invention resides in the provision of a pump of the type described which is sealed through the use of opposed mechanical seals acting against a rotatable sealing ring on the impeller shaft and in providing a lubricating oil reservoir containing lubricating oil which is in communication with the sealing ring and with the inner opposed ends of the mechanical seals. The mechanical seals include resilient means intermediate therein which cause an inward pressure urging the inner ends of the mechanical seals against the sealing ring. In the event the fluid pressure within the lubricating oil reservoir exceeds the inward pressure urging the ends of the mechanical seals against the sealing ring, this pressure from the reservoir may act to urge the mechanical seal outwardly a distance sufficient to open the seal slightly and vent the reservoir to the extent necessary to allow the seals to reseat. In the event the pressure in the oil reservoir is reduced to a sub-atmospheric level, the device will function satisfactorily as the seals would be seated against the sealing ring by the force of the springs in the mechanical seals in addition to the forces caused by the differential of pressure between the outer and inner ends of the mechanical seals. The mechanical seal interposed between the sealing ring and the impeller chamber is urged against the sealing ring by the pressure normally created by the pump at this point of the impeller chamber, and the mechanical seal interposed between the sealing ring and the other end of the enclosing hub or sleeve under such conditions is urged inwardly by atmospheric pressure.

A feature of the present invention resides in the provision of a seal located in the pump housing and communicating with the impeller chamber on the side of the impeller opposite the intake side. Passages are provided through the impeller between the intake of the impeller and the discharge thereof so that the side of the impeller chamber communicating with the seals is subjected to a pressure intermediate the intake pressure and the discharge pressure. As a result, the mechanical seals are urged against the sealing ring with a force which is variable depending upon the height of the head against which the pump is discharging and the height of the head under which liquid is being supplied. Thus the sealing pressure will to some extent be dependent upon the pump pressures and a more effective seal will be provided when pump pressures require a more effective seal. At the same time, in the event the pump runs dry, the sealing pressures are materially reduced to eliminate wear.

These and other objects and novel features of the present invention will be more clearly and fully set forth in the following specification and claims.

In the drawings forming a part of the specification,

Figure 1:
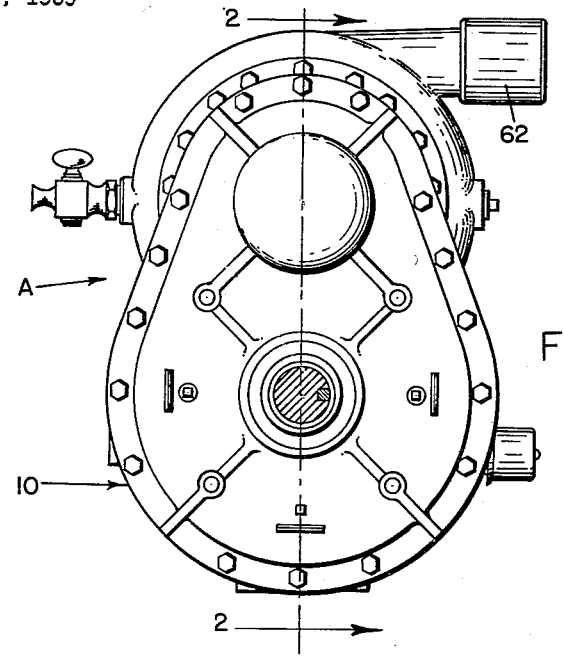
FIGURE 1 is an elevational view of the pump showing the general arrangement of parts therein.
Figure 3:
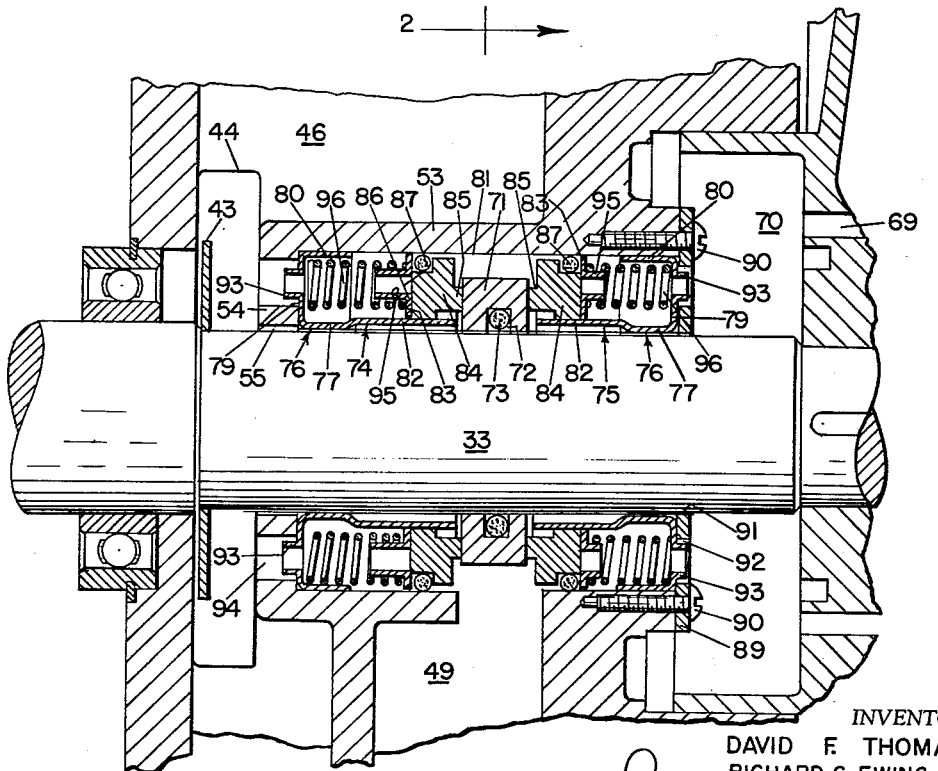
FIGURE 3 is an enlarged sectional detail through the portion of the pump housing enclosing the seal and showing the seal in detail.
Figure 2:
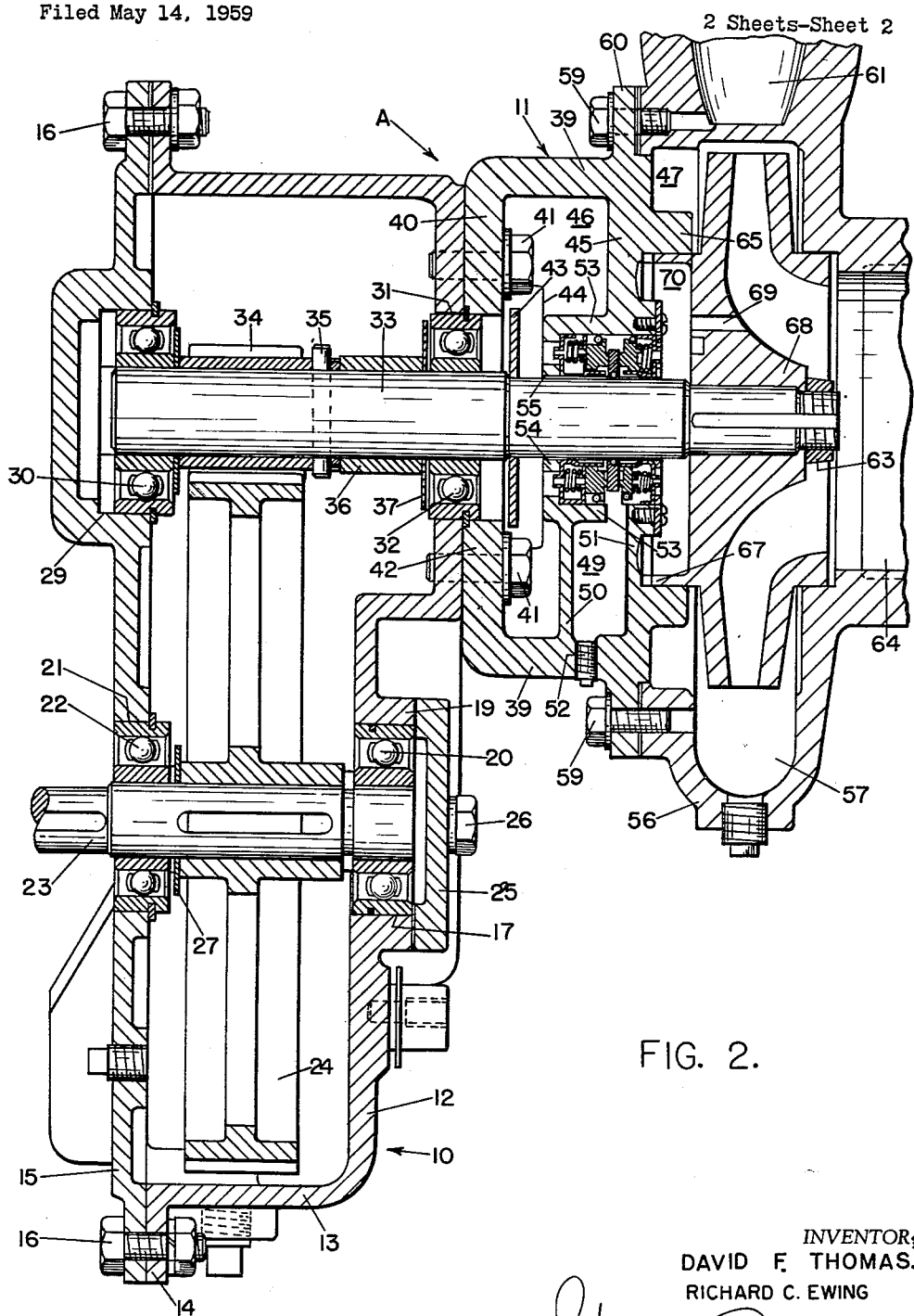
FIGURE 2 is a cross sectional view through the pump, the position of the section being indicated by the line 2—2 of FIGURE 1.

The pump is indicated in general by the letter A and includes a gear housing shown in general by the numeral 10 and a pump housing indicated in general by the numeral 11. The gear case 10 includes a wall 12 which is provided with a peripheral angularly extending flange 13 forming the outer peripheral walls of the gear case and which includes an out-turned peripheral mounting flange 14 generally parallel to, and spaced from, the wall 12. A closure plate 15 is bolted or otherwise secured to the mounting flange 14 by bolts 16 or other suitable means.

The wall 12 is provided with an aperture 17 reinforced by an out turned wall or boss 19 which acts as a support for the outer race of a bearing 20. The closure plate 15 is provided with an aperture 21 aligned with aperture 17 and which serves as the support for the outer race of a bearing 22. The drive shaft 23 leading to, or connected with a suitable source of power is supported with the bearings 20 and 22. A gear 24 is mounted upon the shaft 23 and rotates in unison therewith within the housing. Preferably a bearing cover plate 25 overlies the aperture 17 and is held in place by bolts or cap screws 26 to close this opening through the gear housing. A flinger ring 27 may encircle the shaft 23 inwardly of the bearing 22 to prevent the leakage of lubricant through this bearing.

The cover plate 15 is provided with a hollow cylindrical recess 29 designed to accommodate the outer race of a bearing 30. The wall 12 is provided with an aperture 31 therethrough aligned with recess 29 and designed to accommodate a fourth bearing 32. An impeller shaft 33 is supported by the bearings 30 and 32 and extends through the opening 31 and into the pump housing 11. A pinion 34 is secured to the shaft 32 in any suitable manner as by the pin 35 and meshes with the gear 24 to rotate the impeller shaft 33. A spacing sleeve 36 may encircle the impeller shaft 33 within the gear housing 12 and a flinger ring 37 may encircle the shaft inwardly of the bearing 32 to prevent the passage of lubricant through the bearing 32 and into the pump housing.

The pump housing 11 includes an end wall 40 which is secured to the plate 12 of the gear housing 10 by bolts 41 or other suitable means. The end plate 40 is provided with an aperture 42 extending therethrough which is concentric with the aperture 30 in the gear housing 10 and partially encircles the bearing 32. A flinger ring 43 is mounted upon the impeller shaft 33 inwardly of the end wall 40 so as to direct any liquid passing the pump seal to the periphery of the pump housing which may be apertured as indicated at 44 to subject this portion of the pump housing to atmospheric pressure.

A partition wall 45 extends inwardly from the outer wall 39 to separate the chamber 46 which is subjected to atmospheric pressure from the impeller chamber 47 on the opposite side of the partition wall 45. A reservoir 49 is formed within a portion of the partition wall 45, at least the lower portion of the partition wall being cored to provide a spaced partition wall portion 50 and 51 which define opposite walls of the reservoir 49. The reservoir 49 forms a lubricant chamber as will be later described and a plug 52 is provided through the wall of the housing leading to the reservoir 49 to permit the filling and draining of the reservoir or lubricant chamber 49.

The partition wall 45 and partition wall portion 50 act as a support for a hollow cylindrical ring or sleeve 53 having a closed end 54 provided with an aperture 55 through which the impeller shaft 33 extends. The space between the sleeve 53 and the shaft 33 forms a seal chamber in which the shaft seals are located. The detail of construction of these seals will be later described in detail.

An impeller housing 56 containing the volute 57 is bolted or otherwise secured by means such as the bolts 59 to an outwardly directed mounting flange 60 on the outer wall 39 of the pump housing 11. The volute 57 communicates with a discharge passage 61 which leads to a discharge connection 62 illustrated in FIGURE 1 of the drawings. An impeller 68 is keyed to the impeller shaft 33 within the volute 57 and is held in place by suitable means such as by the retaining nut 63 threaded on the end of the impeller shaft 33. The volute containing portion of the pump housing is provided with an axial intake passage 64 which communicates with the intake of the volute.

The partition 45 and the partition portion 51 are provided with a circular flange 65 which extends toward the impeller 68 and the impeller 62 is provided with a circular flange 67 extending into the flange 65 with a running fit. One or more openings 69 are provided through the impeller 68. Liquid may flow in limited amounts from impeller chamber 47 to the chamber 70, and thence into openings 69 to the suction chamber 64. As a result, the liquid in chamber 70 is under a pressure which is normally greater than the intake pressure.

To this point, the specific description of the pump is mainly to show the general arrangement of the parts as to this point the structure is somewhat conventional. It is important to note, however, that the seals are enclosed within the sleeve 53 forming a part of the pump housing and that the chamber 46 on one side of the seals is subject to atmospheric pressure, while the chamber 70 at the other end of the seals is subject to a fluid pressure which is intermediate between the impeller suction pressure and the impeller discharge pressure. The formation of the seals, which is the important part of the present invention, will now be described.

A sealing ring 71 encircles the impeller shaft 33 intermediate the ends of the sleeve 53 and is arranged to normally rotate in conjunction with the shaft 33. A groove 72 is provided in the inner surface of the sealing ring 71 and an O-ring 73 or other resilient sealing ring acts as a seal between the ring 71 and the shaft 33. A pair of mechanical seals which are indicated in general by the numerals 74 and 75 are interposed on opposite sides of the sealing ring 71. In view of the fact that the mechanical seals 74 and 75 are identical except that they are arranged in opposed relation, the same numerals will be used to identify similar parts.

The seals 74 and 75 are mounted in supporting cages 76 which include ring shaped portions 77 supported with clearance for the outer surface of the impeller shaft 33. The cages 76 include ring shaped end plates 79 which terminate in reversely turned sleeve portions 80 which are slidably supported against the hollow cylindrical inner surface 81 of the sleeve 53. The cages also include axially aligned ridges 82 which protrude outwardly from the cylindrical sleeve portions 77 to which they are connected.

Bearing plates 83 of ring shaped form encircle the seal cages and act to bear against sealing members 84 having cylindrical projecting flanges 85 which are in constant contact with opposite sides of the sealing ring 71. The sealing members 84 are externally grooved as indicated at 86 to accommodate sealing rings 87. In the arrangement illustrated, the sealing rings 87 are seated between portions of the sealing rings 84 and a surface of the bearing plates 83. The members 84 include axially aligned notches on their inner surfaces which engage with ridges 82 and are therefore prevented from rotating relative to the seal cages 76.

A seal retaining plate 89 is secured to the end of the sleeve 53 by screws 90 or other suitable means, the plate 89 being axially apertured as indicated at 91 to accommodate the impeller shaft 33. The plate 89 is provided with a series of angularly spaced apertures 92 arranged at a common radius from the axis of the shaft 33. The end plates 79 of the seal cages are provided with angularly spaced tubular bosses or projections 93 which extend into the apertures 92 to hold the seal cage from rotation relative to the plate 89.

The end plate 79 of the opposite seal 74 is similarly provided with tubular bosses or projections 93 which are in angularly spaced relation and which extend into cooperable angularly spaced apertures 94 in the end wall 54 of the sleeve 53. Thus both seals are held from rotation by engagement with the walls which lie outwardly of the seal.

The bearing rings 83 are provided with a series of angularly spaced tubular bosses 95 which extend in a direction away from the sealing members 84. Springs 96 encircle the bosses 95 and are interposed between the bearing rings 83 and the outer plates 79 of the seal cages. It should be noted that the apertures 94 through the sleeve end wall 54 and the openings 92 through the retaining plate 89 communicate the outer ends of the adjoining seals 74 and 75 to atmospheric pressure and to the fluid pressure of the chamber 70. The inner opposed ends of the mechanical seals 74 and 75 communicate with the lubricant reservoir 49 as will be evidenced from the drawings. It should also be noted that the springs 96 normally hold the sealing rings 84 against the outer surface of the central sealing ring 71 which is sealed relative to the impeller shaft 33 and normally rotates in use therewith. As the sealing ring 84 is sealed relative to the inner wall surface 81 of the enclosing sleeve 53, a running seal is provided between the intermediate sealing ring 71 and the opposed sealing rings 84 of the seals 74 and 75.

In the operation of the pump, the reservoir 49 is first filled or substantially filled with lubricating oil or other similar fluid which will lubricate and cool the seals. In the event excessive pressure should build up in this reservoir for any reason such as by expansion of the fluid due to generated heat, the seals will open slightly by compression of the springs 96 and vent the reservoir 49 until the pressure is lowered sufficiently to allow the seals to recede. If, on the other hand, the pressure in the reservoir 49 should be reduced to a sub-atmospheric level, the device will function satisfactorily as the seals will be seated by the force of the spring in addition to the forces due to the differential between the pressure either to the right of the seal or to the left thereof. As was explained, the pressure to the right of the seals in the chamber 70 is a pressure intermediate the pump discharge and suction pressure and the pressure to the left of the seal is atmospheric pressure.

The pressure in the chamber 70 to the right of the seal is indeterminate and may vary considerably. If the pump is discharging against a relatively high head and is being supplied with liquid under a relatively high head, it is obvious that the pressure in this particular zone 70 will be above atmospheric and perhaps relatively high. When this occurs the force acting against the right hand seal will become relatively high due to a pressure differential between the ends of the seals. However, in actual practice, the force acting against the right hand seal should never be sufficiently high to cause seal damage. If, on the other hand, the pump is discharging against a relatively low head and is drafting liquid then the pressure in the zone 70 may be subatmospheric. If the pressure in chamber 70 should become low enough so that the force due to the unbalance between the oil pressure in the oil reservoir and that existing in zone 70 is higher than the force exerted by the seal springs, then the right hand seal will open slightly until liquid leaks from the oil reservoir into the pump chamber, thus reducing pressure in the oil reservoir until the balance is restored. However, under normal operating conditions, the vacuum in chamber 70 will never be high enough to cause such an action.

During the operation of the pump, it is very possible that the pump will be operated dry from time to time. When this occurs, most seal arrangements would be subject to injury and undue wear. However, the present arrangement is designed particularly to take care of such occasions. If the pump should be operated dry and at higher than normal speeds (due to the engine racing when the pump runs out of liquid) then the seals will continue to run without damage due to the pressure of the lubricant in the oil reservoir.

In accordance with the patent statutes, we have described the principles of construction and operation of our Improvement in Centrifugal Pump with Double Mechanical Seal, and while we have endeavored to set forth the best embodiment thereof, we desire to have it understood that changes may be made within the scope of the following claims without departing from the spirit of our invention.

We claim:

1. A rotary seal including a rotary shaft, a housing rotatably supporting said shaft, said housing defining a first chamber into which said shaft extends and which may be subject to variable fluid pressure, said housing also defining a seal chamber adjoining said first chamber and through which said shaft extends, said seal chamber including an end wall between said chambers, said seal chamber having a second end wall including aperture means providing communication with atmospheric pressure, said end walls being spaced axially of said shaft, said housing also including a lubricant reservoir communicating with said seal chamber intermediate said end walls and which may be subject to varying pressure, a first sealing ring encircling said shaft and rotatable therewith intermediate said end walls, a pair of opposed compressible seals on opposite sides of said sealing ring and engageable therewith with a running fit, said compressible seals being sealed relative to said seal chamber on a diameter larger than the diameter on which said seals engage with said sealing ring and held from rotation relative thereto, said housing providing communication between the ends of the compressible seals engaging the sealing ring and said lubricant reservoir, the ends of said compressible seals engaging said sealing ring being exposed to the fluid pressure within said reservoir over a definite area and the other ends of said compressible seals being exposed to fluid pressure within said first chamber and to atmospheric pressure, respectively, over areas greater than those areas exposed to the fluid pressure in the reservoir at the other ends, whereby when the force exerted by the fluid pressure within said reservoir acting on one end exceeds the compressive force exerted by atmospheric pressure acting on the other end and by one of said compressible seals, said fluid pressure in said reservoir will automatically vent to atmosphere, and when said pressure in said first chamber increases, the other of said compressible seals will be more firmly engaged with said sealing ring.

2. The structure of claim 1 and in which said lubricant reservoir comprises a normally closed chamber.

3. The structure of claim 1 and in which said compressible seals include second sealing rings axially movable on said shaft and engageable against said first sealing ring, and resilient means urging said second sealing rings against said first sealing ring.

4. The structure of claim 1 and in which said compressible seals include seal cages slidably supported in said seal chamber against said end walls, second sealing rings sealed relative to the sealing chamber and engaging opposite sides of said first sealing ring, said second sealing rings being slidable axially of said shaft, and resilient means interposed between said seal cages and said second sealing rings.

References Cited in the file of this patent
UNITED STATES PATENTS

| | | |
|---|---|---|
| 2,320,708 | Yost | June 1, 1943 |
| 2,430,509 | Hoover | Nov. 11, 1947 |
| 2,555,492 | Kidney | June 5, 1951 |
| 2,583,777 | Jacobsen | Jan. 29, 1952 |
| 2,634,990 | Fink | Apr. 14, 1953 |
| 2,843,404 | Janetz | July 15, 1958 |